(12) United States Patent
Wehr

(10) Patent No.: US 10,767,385 B2
(45) Date of Patent: Sep. 8, 2020

(54) PORTABLE HOLDER

(71) Applicant: Simon David Gray Wehr, San Clemente, CA (US)

(72) Inventor: Simon David Gray Wehr, San Clemente, CA (US)

(*) Notice: Subject to any disclaimer, the term of this patent is extended or adjusted under 35 U.S.C. 154(b) by 0 days.

(21) Appl. No.: 16/133,364

(22) Filed: Sep. 17, 2018

(65) Prior Publication Data
US 2020/0087946 A1 Mar. 19, 2020

(51) Int. Cl.
*E04H 12/22* (2006.01)
*A45B 25/00* (2006.01)
(Continued)

(52) U.S. Cl.
CPC ......... *E04H 12/2215* (2013.01); *E04H 12/22* (2013.01); *E04H 12/2238* (2013.01);
(Continued)

(58) Field of Classification Search
CPC ............ E04H 12/2215; E04H 12/2269; E04H 12/2238; E04H 12/2246; E04H 12/2261; E04H 12/22; E04H 12/2253; E04H 12/2292; E04H 12/2284; E04H 12/223; A45B 2023/0012; A45B 2025/003;
(Continued)

(56) References Cited

U.S. PATENT DOCUMENTS

| | | | |
|---|---|---|---|
| 1,402,561 A * | 1/1922 | Banks | E04H 12/2215 52/154 |
| 2,533,322 A * | 12/1950 | Kober | A45B 23/00 135/16 |

(Continued)

FOREIGN PATENT DOCUMENTS

| | | | |
|---|---|---|---|
| DE | 2148023 B1 * | 8/1972 | ......... E04H 12/2238 |
| DE | 29701442 U1 | 7/1997 | |

(Continued)

OTHER PUBLICATIONS

BenefitUSA, BenefitUSA 18" Round Sand Base Weight Bag for Patio Umbrella or Flagpole Outdoor, https://www.bhg.com/shop/benefitusa-benefitusa-18-round-sand-base-weight-bag-for-patio-umbrella-or-flagpole-outdoor-p0f6669ceb1f87bc3deb34662e70e7f59.html, Sep. 10, 2018, 4 pages.

(Continued)

*Primary Examiner* — Hiwot E Tefera
*Assistant Examiner* — Taylor L Morris
(74) *Attorney, Agent, or Firm* — Cislo & Thomas, LLP

(57) ABSTRACT

A portable holder for securing a shaft of an item to a ground surface. The holder has a flexible base and a sleeve. The base has a center, a perimeter, a center hole disposed through the center and an upwardly projecting lip coupled to the perimeter. The base has a plurality of openings spaced around the perimeter for use with one or more stakes. The sleeve is coupled to the base and configured to receive a portion of the shaft. The sleeve has an internal bore aligned with the center hole in the base. When the shaft is received by the sleeve, the shaft passes through the bore, through the center hole, and into the ground surface. The sleeve has an inner surface and an outer surface, the inner surface having a plurality of gripping protrusions, and a plurality of securing straps coupled to the outer surface of the sleeve.

15 Claims, 4 Drawing Sheets

(51) Int. Cl.
*A45F 3/44* (2006.01)
*A45B 23/00* (2006.01)

(52) U.S. Cl.
CPC ..... *E04H 12/2246* (2013.01); *E04H 12/2269* (2013.01); *A45B 23/00* (2013.01); *A45B 2023/0012* (2013.01); *A45B 2025/003* (2013.01); *A45F 3/44* (2013.01); *E04H 12/2253* (2013.01); *E04H 12/2261* (2013.01); *F16M 2200/08* (2013.01)

(58) Field of Classification Search
CPC ........ A45F 3/44; E01F 9/685; E01F 15/0469; F16M 2200/08; A01G 13/0281; A01G 13/10; A01G 13/105; A01G 13/0237; A01G 13/0243; E01C 9/005
USPC ....... 248/530, 156, 523, 533, 519, 545, 508, 248/910, 218.4, 511, 512, 514
See application file for complete search history.

(56) References Cited

U.S. PATENT DOCUMENTS

| | | | | |
|---|---|---|---|---|
| 2,805,109 | A * | 9/1957 | Kopmar | A45B 23/00 108/25 |
| 3,005,287 | A * | 10/1961 | Dudley | A01G 13/0281 47/21.1 |
| 3,624,732 | A * | 11/1971 | Bowden | A45B 3/00 108/151 |
| 3,704,004 | A * | 11/1972 | Carter, Jr. | A01K 3/00 256/1 |
| 3,755,965 | A * | 9/1973 | Emery | A01G 13/0243 47/48.5 |
| 4,026,094 | A * | 5/1977 | Sasur | A01D 7/10 135/118 |
| 4,148,455 | A * | 4/1979 | Oliver | E04H 12/2246 248/524 |
| 4,268,992 | A * | 5/1981 | Scharf, Sr. | A01G 13/0243 47/21.1 |
| 4,269,010 | A * | 5/1981 | Glass | E04H 17/08 52/154 |
| 4,296,693 | A * | 10/1981 | Archer | E04H 12/2246 108/28 |
| 4,308,688 | A * | 1/1982 | Revane | E01C 9/005 47/32 |
| 4,402,166 | A * | 9/1983 | Wortham, Jr. | E04H 12/223 248/156 |
| 4,469,302 | A * | 9/1984 | Stoudt | E04H 12/2215 248/512 |
| 4,502,244 | A * | 3/1985 | Yoham | A01G 13/0281 47/32 |
| 4,584,789 | A | 4/1986 | Jean et al. | |
| 4,609,175 | A * | 9/1986 | Conover | A45B 11/00 135/16 |
| 4,648,203 | A * | 3/1987 | Worzek | A01G 13/0281 47/32 |
| 4,699,347 | A * | 10/1987 | Kuhnley | A47G 33/1213 248/230.8 |
| 4,714,225 | A * | 12/1987 | Skinner | H01Q 1/1242 248/523 |
| 4,858,378 | A * | 8/1989 | Helmy | A01G 13/0281 47/33 |
| 4,922,652 | A * | 5/1990 | Graves | A01G 13/0243 47/32.6 |
| 4,932,157 | A * | 6/1990 | Shimp | A01G 13/0237 47/32 |
| 4,937,991 | A * | 7/1990 | Orth | E04D 13/1407 138/157 |
| 5,065,975 | A * | 11/1991 | Giles | A47G 29/1216 232/39 |
| 5,085,001 | A * | 2/1992 | Crawley | A01G 13/0281 47/30 |
| 5,101,525 | A * | 4/1992 | Ippolito | E04H 15/62 135/118 |
| 5,347,667 | A * | 9/1994 | Schwarz | A45B 23/00 135/16 |
| 5,354,031 | A * | 10/1994 | Bilotti | E04H 12/2238 248/511 |
| 5,355,623 | A * | 10/1994 | Brown | A01G 13/0281 47/32 |
| 5,367,822 | A * | 11/1994 | Beckham | A01G 13/0281 47/32 |
| 5,452,877 | A * | 9/1995 | Riffle | E04H 12/2246 248/511 |
| 5,548,923 | A * | 8/1996 | Myer | A01G 13/0281 47/32 |
| 5,636,944 | A * | 6/1997 | Buttimore | E04H 12/2246 248/530 |
| 5,639,057 | A * | 6/1997 | Yeomans | A01K 97/10 248/156 |
| 5,746,031 | A * | 5/1998 | Burns | A62C 2/00 248/519 |
| 5,749,386 | A * | 5/1998 | Samuel, Jr. | A45B 3/00 135/118 |
| 5,842,676 | A * | 12/1998 | Plzak | A47G 33/1226 248/523 |
| 5,918,411 | A * | 7/1999 | Hadrava | A01G 13/0281 47/21.1 |
| 6,092,342 | A * | 7/2000 | Sharapata | E04H 12/2269 248/519 |
| 6,164,613 | A * | 12/2000 | Williams | E04H 12/2246 248/533 |
| 6,219,991 | B1* | 4/2001 | Salek-Nejad | E04C 3/34 156/172 |
| 6,242,070 | B1* | 6/2001 | Gillispie | E01F 15/141 428/122 |
| 6,354,554 | B1* | 3/2002 | Hollenbeck | E04H 12/2246 248/156 |
| 6,553,726 | B1* | 4/2003 | Roberts | A01G 13/105 47/32.5 |
| 6,612,082 | B2* | 9/2003 | Schimmelpfennig | E04C 5/161 248/523 |
| 6,619,610 | B1* | 9/2003 | Genovese | E04H 12/2246 135/118 |
| D485,743 | S * | 1/2004 | Wilson, Sr. | D8/354 |
| 6,702,244 | B2* | 3/2004 | Bock | B62B 5/0083 248/146 |
| 6,827,321 | B1* | 12/2004 | Murren | A47G 33/12 248/519 |
| 6,892,499 | B1* | 5/2005 | Mayle | E04D 13/1407 285/42 |
| 6,953,180 | B1* | 10/2005 | Ruvalcaba | E04H 12/2215 135/118 |
| 7,080,484 | B2* | 7/2006 | Littge | A01G 27/005 47/79 |
| 7,150,579 | B2* | 12/2006 | Newton | E04H 12/2269 404/11 |
| 7,380,561 | B2* | 6/2008 | Nobert | E04H 12/2215 135/118 |
| 7,597,304 | B1* | 10/2009 | Gray | A47G 33/12 248/172 |
| 7,686,277 | B2* | 3/2010 | Westgarde | A01L 31/00 248/530 |
| 7,797,880 | B1* | 9/2010 | Kamau | A01G 9/02 47/66.1 |
| 7,827,747 | B2* | 11/2010 | George | E02D 27/16 248/346.01 |
| 7,883,070 | B2* | 2/2011 | Schroeder | E04H 12/2215 248/156 |
| 7,896,307 | B2* | 3/2011 | Berg | G09F 23/00 248/346.01 |
| 7,958,670 | B2* | 6/2011 | Kamau | A01G 9/02 47/66.1 |
| 8,047,217 | B1 | 11/2011 | Schermerhorn, Jr. | |
| 8,132,358 | B1* | 3/2012 | Wells | A01G 13/0268 47/21.1 |
| 8,375,966 | B2* | 2/2013 | Kuelbs | A45B 3/00 135/16 |

(56) References Cited

U.S. PATENT DOCUMENTS

| | | | | |
|---|---|---|---|---|
| 8,490,255 B1* | 7/2013 | Alhanati | | A45B 11/00 |
| | | | | 135/16 |
| 8,578,955 B1 | 11/2013 | Rothbaum | | |
| 8,881,450 B2* | 11/2014 | Essafi | | A01G 17/04 |
| | | | | 47/32.4 |
| 8,978,676 B2 | 3/2015 | Williams | | E04H 12/2238 |
| | | | | 135/16 |
| 9,115,507 B2* | 8/2015 | Wyrostek | | E04H 12/2292 |
| 9,200,655 B2* | 12/2015 | Pan | | E04H 12/2238 |
| 9,366,051 B1* | 6/2016 | Wojtowicz | | E04H 12/185 |
| 9,732,485 B2* | 8/2017 | McCue | | E04C 3/36 |
| 9,890,551 B1* | 2/2018 | Delao | | E04H 12/2215 |
| 9,974,369 B1* | 5/2018 | DePaolo | | A45B 23/00 |
| 2002/0036008 A1 | 3/2002 | Hickam et al. | | |
| 2002/0139061 A1* | 10/2002 | Roberts | | A01G 13/105 |
| | | | | 52/101 |
| 2002/0185167 A1* | 12/2002 | Lin | | A45B 25/22 |
| | | | | 135/16 |
| 2003/0000152 A1* | 1/2003 | Ryan | | E01F 15/0469 |
| | | | | 52/3 |
| 2005/0108932 A1* | 5/2005 | Hsia | | A01G 13/0281 |
| | | | | 47/32 |
| 2006/0016950 A1 | 1/2006 | Bright et al. | | |
| 2006/0130399 A1 | 6/2006 | McDonald | | |
| 2007/0204891 A1* | 9/2007 | Zubyk | | A45F 3/44 |
| | | | | 135/16 |
| 2008/0072481 A1* | 3/2008 | Conrad | | A01G 13/0281 |
| | | | | 47/31.1 |
| 2008/0134573 A1* | 6/2008 | Flaster | | A01G 13/0237 |
| | | | | 47/29.7 |
| 2009/0126298 A1* | 5/2009 | Salcedo | | E01F 15/141 |
| | | | | 52/288.1 |
| 2009/0261215 A1 | 10/2009 | Lambert | | |
| 2009/0266026 A1* | 10/2009 | Hannay | | E04H 12/2292 |
| | | | | 52/745.17 |
| 2011/0311754 A1* | 12/2011 | Kray | | A01G 13/0281 |
| | | | | 428/66.6 |
| 2012/0085880 A1* | 4/2012 | Lewis | | B63B 17/00 |
| | | | | 248/523 |
| 2012/0235012 A1* | 9/2012 | Andrassy | | A47B 33/12 |
| | | | | 248/523 |
| 2013/0206954 A1 | 8/2013 | Wells et al. | | |
| 2014/0352208 A1* | 12/2014 | Makropoulos | | A01G 13/0293 |
| | | | | 47/31.1 |
| 2015/0020858 A1* | 1/2015 | Kubert | | A01G 13/0293 |
| | | | | 135/118 |
| 2015/0225041 A1* | 8/2015 | Lovett | | A43B 3/108 |
| | | | | 441/21 |
| 2015/0320161 A1* | 11/2015 | Perry | | A45B 25/00 |
| | | | | 248/533 |
| 2017/0022730 A1* | 1/2017 | Mansueto | | E04H 12/2269 |
| 2017/0027342 A1* | 2/2017 | Mishra | | A47G 9/062 |
| 2017/0030104 A1* | 2/2017 | Sinclair | | E04H 17/22 |
| 2017/0086544 A1 | 3/2017 | Martel | | |

FOREIGN PATENT DOCUMENTS

| | | |
|---|---|---|
| DE | 20320060 | 6/2005 |
| ES | 1075333 | 9/2011 |
| ES | 2633039 | 9/2017 |
| GB | 2360451 | 9/2001 |
| WO | WO11030171 | 3/2011 |

OTHER PUBLICATIONS

Ebay, https://www.ebay.com/p/Duraviva-Outdoor-Patio-Umbrella-Base-Stand-Weatherproof-Layover-Cover-Velcro/21007450710, Sep. 10, 2018, 3 pages.

* cited by examiner

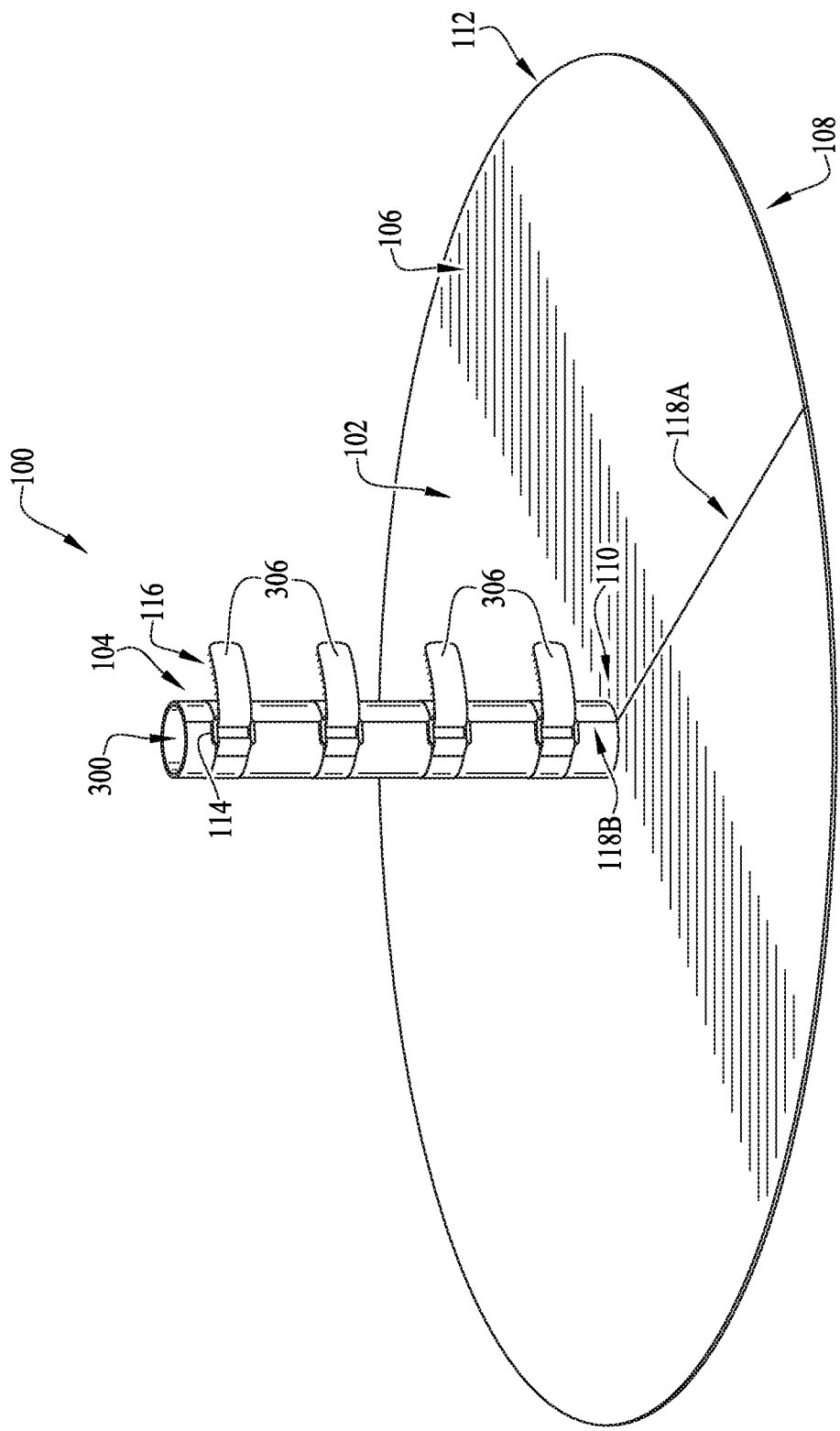

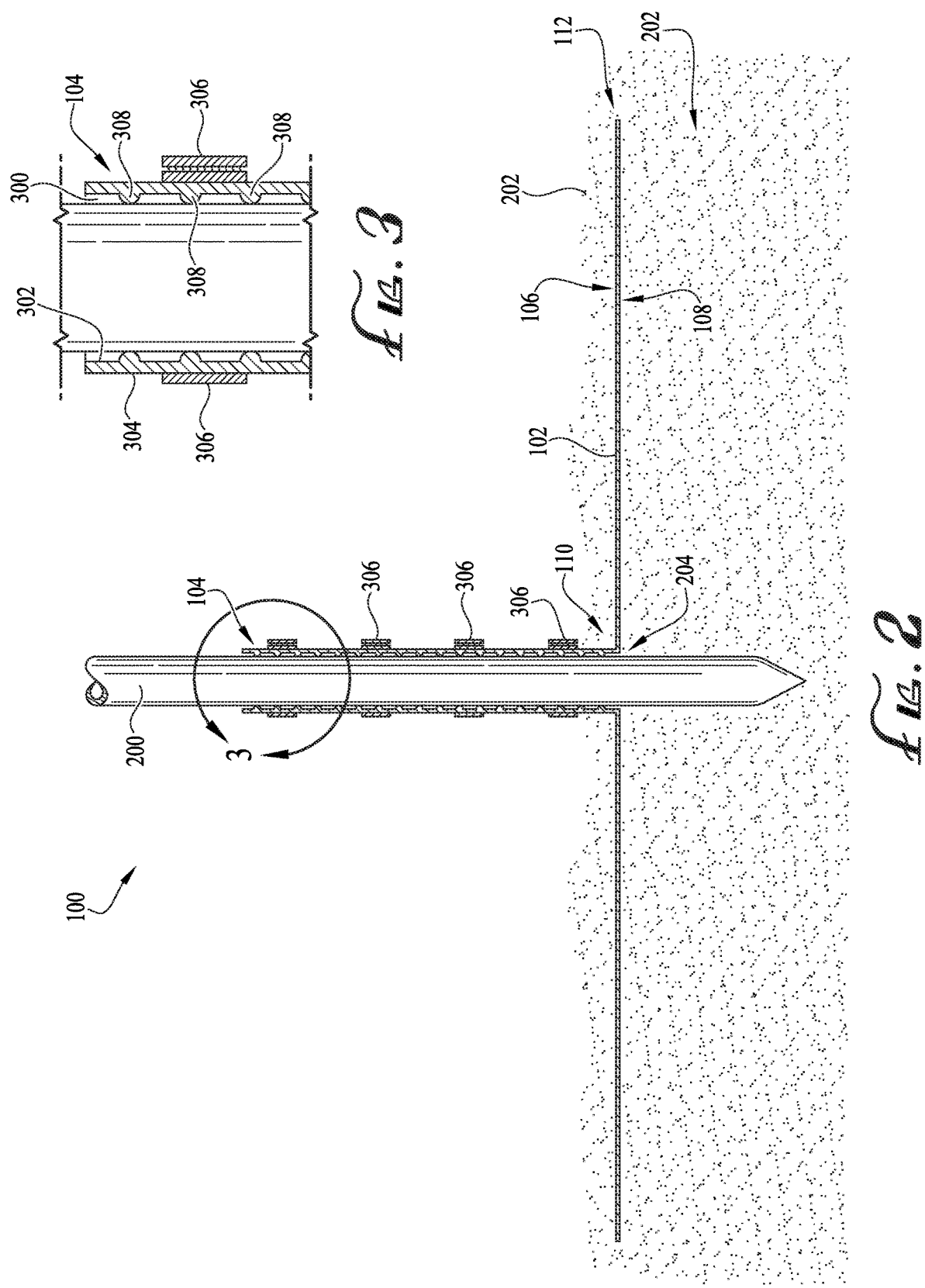

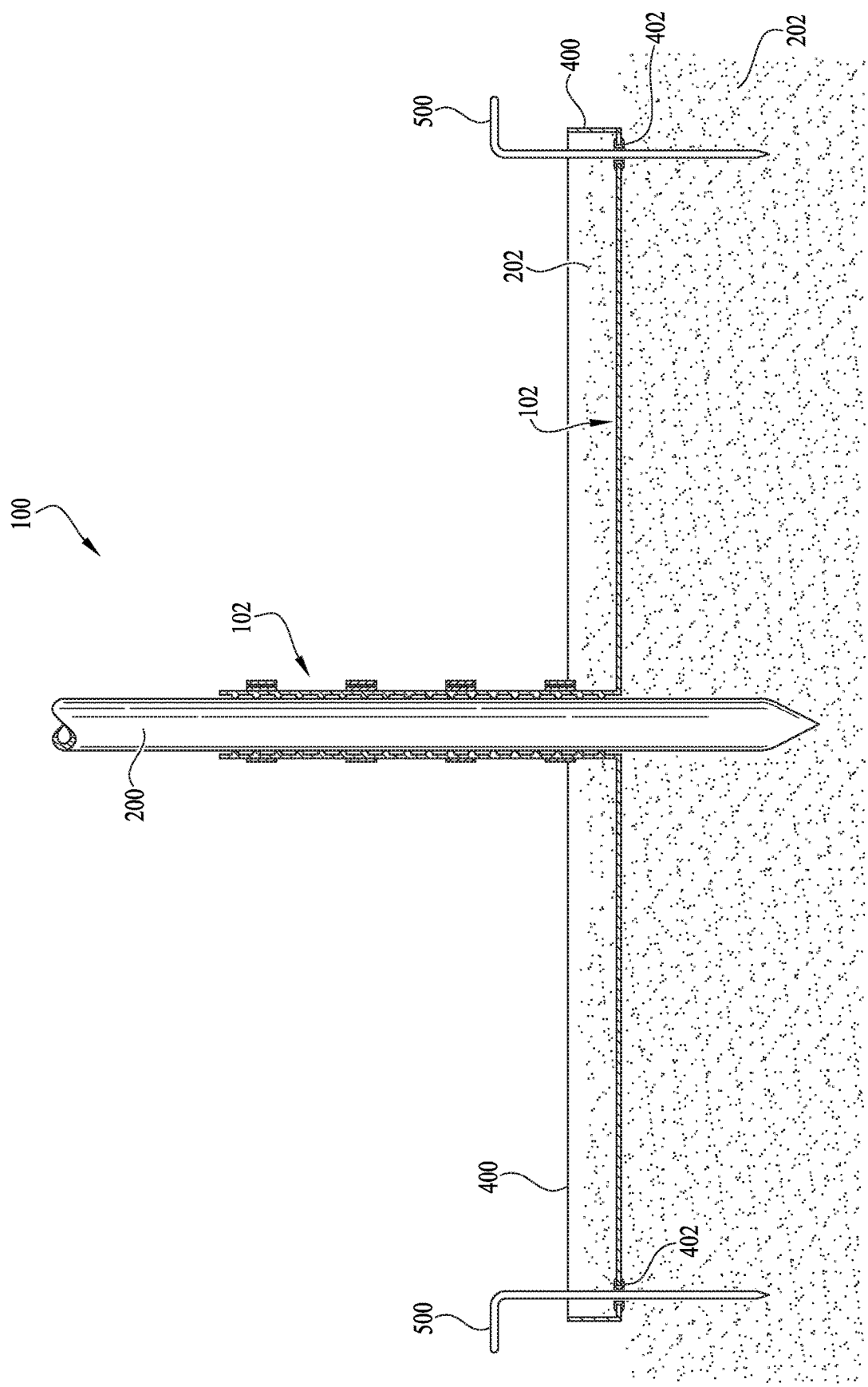

PORTABLE HOLDER

BACKGROUND OF THE INVENTION

Many people get hurt every year by flying beach umbrellas that are not properly anchored in sand. Additionally, flying sun shades and other portable structures can also cause injury if they are not properly anchored. However, there are problems associated with the known beach umbrella holders.

As such, there is a need for an improved portable holder that can be used with more than just beach umbrellas, is lightweight, and easy to use.

The present invention overcomes several of the deficiencies, disadvantages and undesired parameters associated with known beach umbrella holders.

SUMMARY OF THE INVENTION

According to one embodiment of the present invention, there is provided a portable holder for securing a shaft of an item to a ground surface. The holder comprises a flexible base having a center and a perimeter, and a sleeve coupled to the base. The base has a center hole disposed through the center and an upwardly projecting lip coupled to the perimeter, and optionally comprises a plurality of openings spaced around the perimeter for use with one or more stakes to secure the holder to the ground surface. The sleeve is coupled to the base and configured to receive a portion of the shaft. The sleeve comprises an internal bore, an inner surface and an outer surface. The internal bore is aligned with the center hole in the base such that when the shaft of the item is received by the sleeve, the shaft passes through the bore, through the center hole, and into the ground surface. The inner surface has a plurality of gripping protrusions disposed thereon, and a plurality of securing straps are coupled to the outer surface of the sleeve for tightening the sleeve around the shaft disposed there through.

Optionally, the holder is made from nylon.

Optionally, the gripping protrusions are made from silicone.

Optionally, the straps comprise hook and loop fasteners.

According to another embodiment of the present invention, the present invention comprises a portable holder for securing a shaft of an item to a ground surface, the holder comprising a base and a sleeve coupled to the base. The base has a center and a perimeter, a center hole disposed through the center, and an upwardly projecting lip coupled to the perimeter. The sleeve is coupled to the base and configured to receive a portion of the shaft. The sleeve comprises an internal bore aligned with the center hole in the base such that when the shaft of the item is received by the sleeve, the shaft passes through the bore, through the center hole, and into the ground surface, and a plurality of securing straps coupled to the outer surface of the sleeve for tightening the sleeve around the shaft disposed there through.

Optionally, the holder further comprises a plurality of openings spaced around the perimeter of the base for use with one or more stakes to secure the holder to the ground surface.

Additionally, the sleeve can comprise an inner surface and an outer surface, the inner surface having a plurality of gripping protrusions disposed thereon.

Optionally, the base is flexible and the holder is made from nylon.

According to another embodiment of the present invention, there is provided a method of using a portable holder, the method comprising the steps of: a) providing the holder; b) inserting a shaft of an item requiring support into the sleeve; c) tightening the plurality of securing straps such that the sleeve is secured around the shaft; and d) placing the base on a ground surface.

According to another embodiment of the present invention, there is provided a method of using a portable holder, the method comprising the steps of: a) providing the holder; b) burying the base in a ground surface; c) inserting a shaft of an item requiring support into the sleeve; and d) tightening the plurality of securing straps such that the sleeve is secured around the shaft.

According to another embodiment of the present invention, there is provided a method of using a portable holder, the method comprising the steps of: a) providing the holder; b) inserting a shaft of an item requiring support into the sleeve; c) tightening the plurality of securing straps such that the sleeve is secured around the shaft; d) placing the base on a ground surface; and e) inserting a plurality of stakes through the plurality of perimeter openings in the base.

According to another embodiment of the present invention, there is provided a method of using a portable holder to secure a beach umbrella having a shaft to a ground surface, the method comprising the steps of: a) pushing the shaft of the beach umbrella into the ground surface; b) providing the portable holder; c) placing the base of the holder on the ground surface around the shaft of the beach umbrella; d) wrapping the sleeve around the shaft; and e) securing the securing straps around the shaft.

Optionally, the method further comprises the step of placing additional ground surface on top of the base to weigh the base down further.

DRAWINGS

These and other features, aspects and advantages of the present invention will become better understood with reference to the following description, appended claims, and accompanying drawings where:

FIG. 1 is a perspective view of a portable holder having features of the present invention;

FIG. 2 is a sectional view of the portable holder of FIG. 1;

FIG. 3 is an enlarged view of a section of the portable holder of FIG. 2, taken along section line 3-3;

FIG. 5 is a sectional view of the portable holder of FIG. 4.

DETAILED DESCRIPTION OF THE INVENTION

Figure 4:
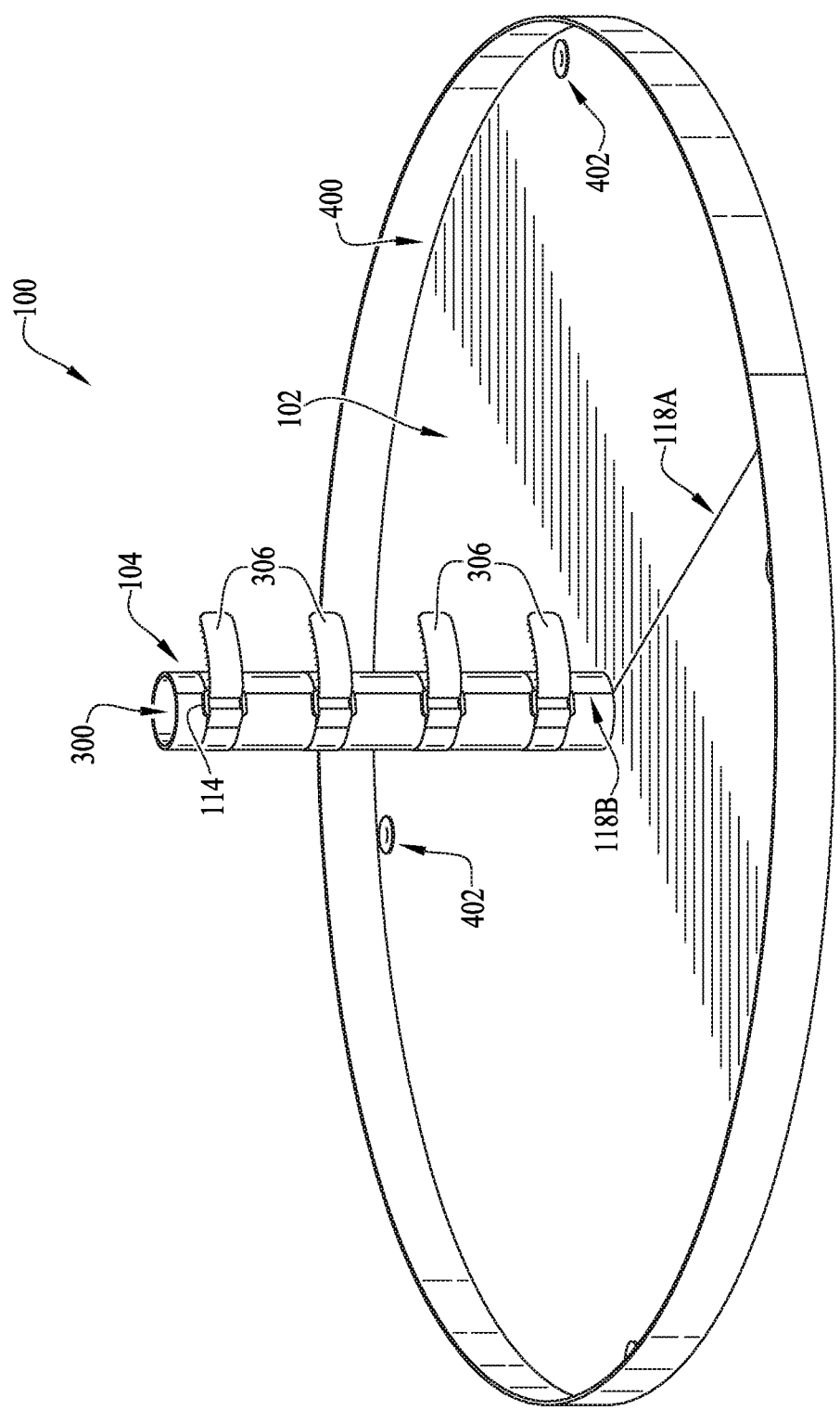
FIG. 4 is a perspective view of an additional embodiment of a portable holder having features of the present invention.

The following discussion describes in detail one embodiment of the present invention and several variations of that embodiment. This discussion should not be construed, however, as limiting the invention to those particular embodiments. Practitioners skilled in the art will recognize numerous other embodiments as well.

Definitions

As used herein, the following terms and variations thereof have the meanings given below, unless a different meaning is clearly intended by the contest in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

The Invention

Referring now to FIG. 1, there is shown a portable holder 100 having features of the present invention. The portable holder 100 is configured for holding a shaft 200 of an item a user wishes to secure to a ground surface 202 to prevent the item from being blown away. The item can be any item that a user wishes to secure to a ground surface. For example, the item can be a beach umbrella or a sun shade with multiple legs to prevent the shade from blowing away. In that instance, a portable holder can be used with each leg of the shade to secure the shade.

The portable holder 100 comprises a base 102 and a sleeve 104 coupled to the base 102.

The base 102 has an upper surface 106, a lower surface 108, a center 110 and a perimeter 112. A center hole 204 is disposed through the center 110 of the base 102. The center hole 204 is best seen in FIG. 2. The base 102 can be any shape and any size, but typically the base 102 is circular and has a diameter of between about 12 inches and 48 inches. Preferably, the diameter of the base is 36 inches.

As shown in FIG. 2, the base 102 can be buried in a ground surface 202; if for example, the ground surface 202 is sand or some other loosely compacted material. Sand 202 can be placed on top of the upper surface 106 of the base 102 to help secure the holder 100, and therefore the shaft 200 of the item, to the ground surface 202. Optionally, if the ground surface 202 is hard and compact and cannot be placed on top of the base 102, heavier items such as coolers and bags can be placed on the upper surface 106 of the base 102 to help secure the holder 100 to the ground surface 202.

The sleeve 104 is coupled to the base 102 and is configured to receive a portion of the shaft 200. As best shown in FIGS. 2 and 3, the sleeve 104 comprises an internal bore 300, an inner surface 302, an outer surface 304, and a plurality of securing straps 306. The sleeve 104 can be any length and any diameter, but typically the sleeve 104 is between about 6 inches and 24 inches long and between about 1 inch and 3 inches in diameter. Preferably, the sleeve 104 is 12 inches long and 2 inches in diameter.

The internal bore 300 is aligned with the center hole 204 in the base 102 such that when the shaft 200 of the item is received by the sleeve 102, the shaft 200 passes through the bore 300, through the center hole 204, and into the ground surface 202. The internal bore 300 is sized to have a diameter that is slightly larger than the diameter of a conventional umbrella shaft. Typically, the diameter of the bore 300 is 2 inches.

In order to secure the sleeve 104 to the shaft 200, the inner surface 302 of the sleeve 104 has a plurality of gripping protrusions 308 disposed thereon. The protrusions 308 can either be in the shape of dots or lines, and are typically made from silicone coupled to the sleeve 104 material. Silicone, or some other commensurate material, has the necessary frictional properties to provide the desired grip on the shaft 200.

The plurality of securing straps 306 are coupled to the outer surface 304 of the sleeve 104 for tightening the sleeve 104 around the shaft 200 disposed therein. Typically, there are four securing straps 306, equally spaced along the sleeve 104; however, there can be any number of straps 306, including just one strap 306. Each strap 306 comprises a ring 114 through which the strap 306 is fed. The straps 306 then folds back on themselves and hook and loop fasteners 116 disposed on outer surfaces and corresponding inner surfaces of the straps 306 are used to secure the ends of the straps 306 to themselves. This configuration then secures the straps 306 in the tightened position around the shaft 200 disposed within the sleeve 104.

Optionally, instead of using the ring 114 and hook and loop fasteners 116, other options for securing mechanisms to secure the straps 306 in the tightened position include, but are not limited to, magnets, snaps, buttons, rigid hooks and loops, zippers, belt buckle mechanisms, or plastic slide release buckles.

Optionally, both the base 102 and the sleeve 106 comprise a slit 118 that bifurcates the holder 100. The slit 118A in the base 102 extends from the center hole 204 to the perimeter 112 of the base 102. The slit 118B in the sleeve 104 runs the entire length of sleeve 104 and aligns/joins with the slit 118A in the base 102 at the center hole 204.

The slit 118 makes it easier to put the holder 100 on an umbrella shaft 200, as the umbrella shaft 200 can be inserted into the ground surface 202, and then due to the slit 118, both the base 102 and the sleeve 104 can be split open and inserted around the shaft 200 of the umbrella. Once in place, the straps 306 are cinched down and the sleeve 104 is secured around the shaft 200. The base 102 can then buried in the ground surface 202, or weighed down with heavier items. Optionally, the base 102 can be buried/weighed down first, prior to cinching the straps 306 down around the shaft 200.

The holder 100, including both the base 102 and the sleeve 104, can be made from any material, but preferably the holder 100 is made of a flexible material, such as a synthetic thermoplastic polymer like nylon, or PVC coated polyester yarn woven fabric. Optionally, the holder 100 is made from a rigid material, such as plastic.

Optionally, as shown in FIGS. 4 and 5, and an upwardly projecting lip 400 can be coupled to the perimeter 112 of the base 102. The lip 400 provides the added advantage of helping prevent the ground surface 202 (such as sand) from running off the base 102 if the umbrella (and therefore the holder 100 coupled to it) is lifted in a gust of wind. The lip 400 can be any height, but preferably the lip 400 is 0.5 inches to 3 inches tall. Preferably, the lip 400 is 1.5 inches tall.

Optionally, as shown in FIGS. 4 and 5, the base 102 comprises a plurality of openings 402 (each optionally comprising a reinforced eyelet) spaced around the perimeter 112 for use with one or more stakes 500 to secure the holder 100 to the ground surface 202. In use, the stakes 500 are inserted through the plurality of openings 402 and into the ground surface 202, providing an extra means of securing the holder 100 to the ground surface 202. The stakes 500 are helpful, if, for example, the ground surface 202 is hard, or more compact than sand, such that the base 102 cannot be buried.

In one embodiment, the present invention comprises a method of using the portable holder 100 on a ground surface 202 with a beach umbrella having a shaft 200. The method comprises the steps of a) pushing the shaft 200 of the beach umbrella into the ground surface 202, b) placing the base 102 on the ground surface 202 around the shaft 200 of the beach umbrella, c) wrapping the sleeve 104 around the shaft 200, and d) securing the securing straps 306 around the shaft

200. Optionally, if the beach umbrella is used on sand, sand can be used to bury the base and weigh the base 102 down further.

In another embodiment, the present invention comprises a method of using the portable holder, the method comprising the steps of a) providing the holder, b) inserting a shaft of an item requiring support into the sleeve, c) tightening the plurality of securing straps such that the sleeve is secured around the shaft, and d) placing the base on a ground surface. Optionally, after step d) inserting a plurality of stakes 500 through the plurality of perimeter openings 402 in the base 102. Optionally, the method further comprises the step of placing additional ground surface 202 on top of the base 102 to weigh the base 102 down further.

In another embodiment, the present invention comprises a method of using the portable holder 100, the method comprising the steps of a) providing the holder 100, b) burying the base 102 in a ground surface 202, c) inserting a shaft 200 of an item requiring support into the sleeve 104, and d) tightening the plurality of securing straps 306 such that the sleeve 104 is secured around the shaft 200. Optionally, before or after step b) inserting a plurality of stakes 500 through the plurality of perimeter openings 402 in the base 102. Optionally, the method further comprises the step of placing additional ground surface 202 on top of the base 102 to weigh the base 102 down further.

To remove the shaft 200 from the holder 100, the user simply unstraps the straps 306, releasing pressure from the sleeve 104, and pulls the shaft 200 up and out of the sleeve 104. Optionally, the straps 306 are undone, and the user splits the holder 100 open along its slit 118, and removes the holder 100 from the shaft 200.

The portable holder 100 of the present invention has several advantages. First, the holder 100 is lightweight, and preferably made from a flexible material. This makes the holder 100 easy to pack and bring to the beach, or wherever the user would like to use it. Additionally, having the sleeve 104 made from the same flexible material as the base 102 provides the added advantage that the holder 100 is not limited to use with a beach umbrella, or something having a shaft/leg of similar diameter and shape as a standard beach umbrella. Because the sleeve 104 is made from a flexible material, it can be wrapped around a shaft or leg having any shape, and the straps 306 will effectively cinch the sleeve 104 down. Most of the prior art uses rigid plastic rings and locking bolts to secure the holders to the umbrella shafts. But if a user wanted to use one of the prior art holders with a sun shade, for example, the prior art holders wouldn't be able to securely lock down on the legs of the sun shade. The holder 100 of the present invention is much more versatile and adjustable.

The addition of the lip 400 around the perimeter 112 is helpful to prevent sand on top of the base 102 from simply sliding off if a big gust of wind lifts the umbrella, and the plurality of perimeter openings 402 and stakes 500 also help secure the base 102 to the ground 202. Most of the prior art does not have the ability to use stakes 500, so they are limited to use with sand, or the user needing to place heavy objects on top of the holders to help secure them down.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference in their entirety.

What is claimed is:

1. A portable holder for securing a shaft of an item to a ground surface, the holder comprising:
    a) a flexible base comprising at least one layer of material for spreading out on a ground surface, the base having a center and a perimeter, the base having a center hole disposed through the center and an upwardly projecting lip coupled to the perimeter, the base further comprising a plurality of openings spaced around the perimeter for use with one or more stakes to secure the holder to the ground surface; and
    b) a flexible sleeve directly coupled to the base and configured to receive a portion of the shaft, the sleeve comprising:
        i) an internal bore aligned with the center hole in the base such that when the shaft of the item is received by the sleeve, the shaft passes through the bore, through the center hole, and into the ground surface;
        ii) an inner surface and an outer surface, the inner surface having a plurality of gripping protrusions evenly spaced along an entire length of the inner surface; and
        iii) a plurality of securing straps coupled to the outer surface of the sleeve for tightening the sleeve around the shaft disposed there through, wherein the flexible sleeve is adjustable to accommodate a shaft having a plurality of shapes and/or sizes.

2. The holder of claim 1, wherein the holder is made from nylon.

3. The holder of claim 1, wherein the gripping protrusions are made from silicone.

4. The holder of claim 1, wherein the straps comprise hook and loop fasteners.

5. The holder of claim 1, wherein both the base and the sleeve comprise a slit that bifurcates the holder.

6. The holder of claim 5, wherein the slit in the base extends from the center hole to the perimeter of the base and the slit in the sleeve runs the entire length of sleeve and aligns/joins with the slit in the base at the center hole.

7. A method of using a portable holder, the method comprising the steps of:
    a) providing the holder of claim 1;
    b) inserting a shaft of an item requiring support into the sleeve;
    c) tightening the plurality of securing straps such that the sleeve is secured around the shaft;
    d) placing the base on a ground surface; and
    e) inserting a plurality of stakes through the plurality of perimeter openings in the base.

8. A portable holder for securing a shaft of an item to a ground surface, the holder comprising:
    a) a flexible base comprising at least one layer of material for spreading out on a ground surface, the base having a center and a perimeter, the base having a center hole disposed through the center and an upwardly projecting lip coupled to the perimeter, and
    b) a flexible sleeve directly coupled to the base and configured to receive a portion of the shaft, the sleeve comprising:
        i) an internal bore aligned with the center hole in the base such that when the shaft of the item is received by the sleeve, the shaft passes through the bore, through the center hole, and into the ground surface;

ii) an inner surface and an outer surface, the inner surface having a plurality of gripping protrusions evenly spaced along an entire length of the inner surface; and iii) a plurality of securing straps coupled to the outer surface of the sleeve for tightening the sleeve around the shaft disposed there through; wherein the flexible sleeve is adjustable to accommodate a shaft having a plurality of shapes and/or sizes; and wherein both the base and the sleeve comprise a slit that bifurcates the holder.

9. The holder of claim 8, further comprising a plurality of openings spaced around the perimeter of the base for use with one or more stakes to secure the holder to the ground surface.

10. The holder of claim 8, wherein the holder is made from nylon.

11. The holder of claim 8, wherein the slit in the base extends from the center hole to the perimeter of the base and the slit in the sleeve runs the entire length of sleeve and aligns/joins with the slit in the base at the center hole.

12. A method of using a portable holder, the method comprising the steps of:

a) providing the holder of claim 8;

b) inserting a shaft of an item requiring support into the sleeve;

c) tightening the plurality of securing straps such that the sleeve is secured around the shaft; and d) placing the base on a ground surface.

13. A method of using a portable holder, the method comprising the steps of:

a) providing the holder of claim 8;

b) burying the base in a ground surface;

c) inserting a shaft of an item requiring support into the sleeve; and d) tightening the plurality of securing straps such that the sleeve is secured around the shaft.

14. A method of using a portable holder to secure a beach umbrella having a shaft to a ground surface, the method comprising the steps of:

a) pushing the shaft of the beach umbrella into the ground surface;

b) providing the portably: holder of claim 8;

c) placing the base of the holder on the ground surface around the shaft of the beach umbrella;

d) wrapping the sleeve around the shaft; and e) securing the securing straps around the shaft.

15. The method of claim 14, further comprising the step of placing additional ground surface on top of the base to weigh the base down further.

\* \* \* \* \*